Sept. 8, 1964 V. D. SMITH 3,147,717
BLENDING APPARATUS
Filed Feb. 12, 1963
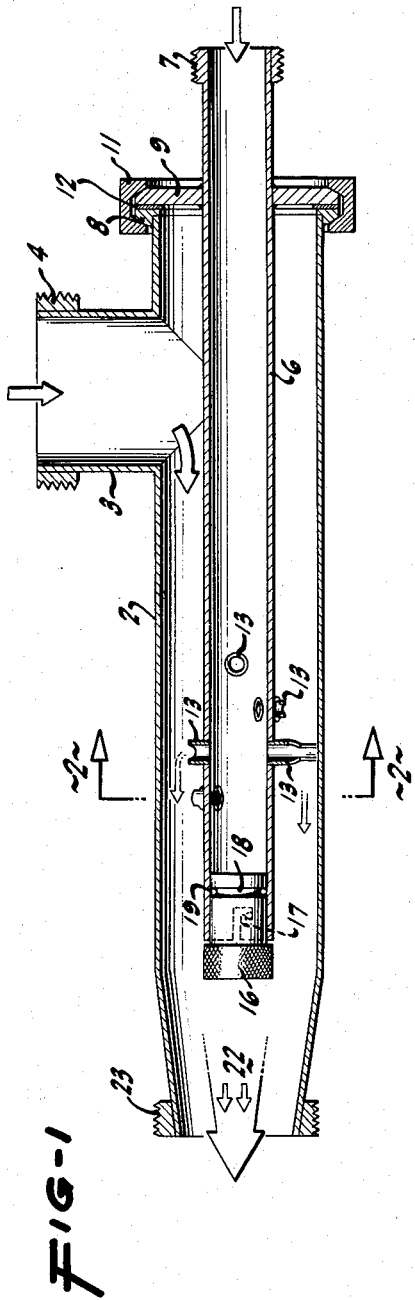
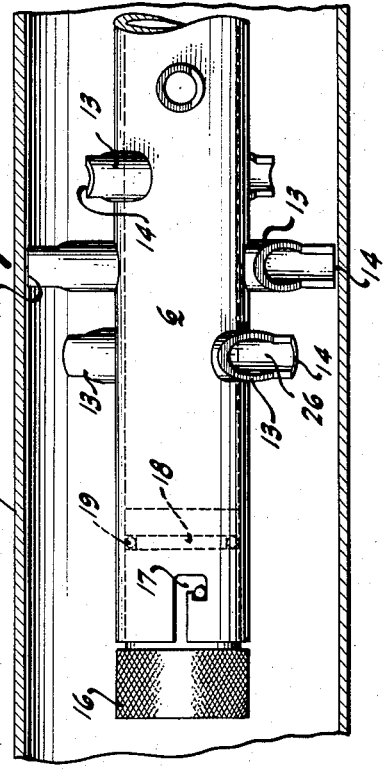
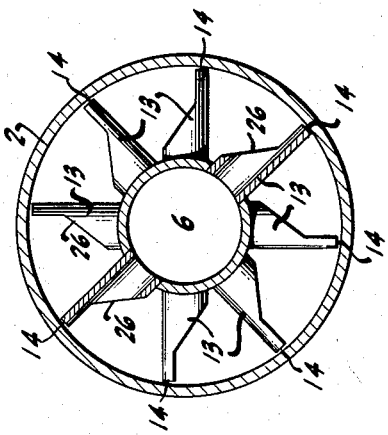
INVENTOR.
VERLE D. SMITH
BY Bialso & Schlemmer
ATTORNEYS

United States Patent Office 3,147,717
Patented Sept. 8, 1964

3,147,717
BLENDING APPARATUS
Verle D. Smith, 18626 Center St., Castro Valley, Calif.
Filed Feb. 12, 1963, Ser. No. 258,078
10 Claims. (Cl. 107—1)

This invention relates to a blending apparatus, and more particularly to an apparatus for blending syrup with ice cream to provide a variegated or marbleized effect.

Objects of the present invention are to provide an improved, simple apparatus for such purpose which is of economical construction, does not contain moving parts, can be readily disassembled for cleaning purposes which is a necessity in apparatus handling food products and readily reassembled again, and which performs an efficient and thorough mixing of the syrup with the ice cream. Other objects of the invention will become apparent from a detailed description of a preferred embodiment of the invention illustrated by the drawings, and which embodies the principles thereof.

Referring to the drawings:

FIG. 1 is a longitudinal vertical section through the apparatus in assembled state; the figure illustrating the parts true to scale but on half scale size;

FIG. 2 is an enlarged transverse vertical sectional elevation taken in a plane indicated by line 2—2 in FIG. 1; this view illustrating the parts full scale;

FIG. 3 is an enlarged fragmentary sectional elevation of the portion of the apparatus shown in FIG. 1; the view also being full scale.

All parts of the apparatus are desirably made of stainless steel for sanitary and ready cleaning purposes; although any other material having these properties can be employed. As can be seen from FIGS. 1 and 3, an outer first tube 2 is provided which at one end portion has an inlet pipe 3 for the ice cream; the pipe carrying an externally threaded ferrule 4 for connection to a freezer of ice cream wherein the ice cream is maintained in semi-frozen condition and continuously pumped into tube 2. A second tube 6 for conducting syrup is arranged concentrically within outer tube 2 and projects beyond such tube, the outer end of which is formed with an externally threaded ferrule 7 for connection to a source of syrup which is continuously pumped into tube 6.

Means is provided for detachably securing tube 6 to tube 2 comprising a peripheral flange 8 fixedly secured, such as by welding, to the inlet end portion of outer tube 2 and a flange 9 fixedly secured, also such as by welding, to the outer end portion of syrup tube 6. The flanges are fixedly but removably secured together by means of a conventional C-type clamping ring 11 with a sealing gasket 12 clamped between flanges 8 and 9. The described clamping ring provides the only detachable connection between the tubes. Thus, it is seen when the clamping ring is disconnected, the syrup tube 6 can be readily removed from within ice cream tube 2 by pulling it axially outwardly.

However, the opposite end of syrup tube 6 is supported in tube 2 by a plurality of outwardly extending syrup nozzle ducts 13 of a special construction and arrangement for a purpose to be described later. Such support is provided by the outer ends 14 of syrup ducts 13 being in loose but substantial engagement with the inner wall of tube 2, thus not only supporting syrup tube 6 but centering the same coaxially within tube 2.

The discharge end portion of syrup tube 6 is completely closed, desirably by a removable plug 16 having a bayonet type connection 17 with tube 6; the inner end of the plug having a groove 18 for receiving a conventional O-ring seal 19. Desirably, the projecting outer end of plug 16 is knurled to facilitate removal and tightening of the plug.

Such syrup discharge end portion of the syrup tube 6 desirably terminates short of the nozzle discharge end portion of outer tube 2, which is inwardly tapered at a slight angle of about 5° to provide a restricted discharge nozzle which builds up back pressure, although this angle is not critical. This enhances uniformity of the variegated pattern. It will be noted in this connection, that the space 22 between the closed end of syrup tube 6 and the nozzle end of tube 2 is completely unobstructed. For connection of the apparatus to a conventional packing machine wherein the blended ice cream is packed, an externally threaded ferrule 23 is secured to the nozzle end of tube 2.

As previously related, the syrup nozzle ducts 13 are arranged in a special manner and are of a special construction. This is for the purpose of providing a wide pattern range of the syrup and the ice cream, and uniform distribution. Each of these ducts extends desirably in a radial direction; and it will be noted particularly from FIGS. 2 and 3 that the ducts are arranged in spaced apart sets, desirably two diametrically opposite ducts forming a set. The ducts of each set have their axes lying in substantially the same plane which extends transversely with respect to the axis of syrup tube; and the ducts are equally angularly spaced about the periphery of syrup tube 6, about 45° apart as can be seen from FIG. 2.

Eight ducts arranged in the manner described produce a most efficient uniform pattern. However, at least six ducts comprising three pairs of diametrically opposite ducts may be used but the pattern result is not too good. Moreover, when ten ducts comprising five diametrically pairs or sets are employed, sharpness of the pattern is reduced.

An important constructional feature of the syrup discharge ducts is that they are cut away laterally at their outer ends, thus forming removed portions which provide lateral discharge openings 26 for the syrup. Thus, the syrup can flow laterally outwardly into the main body of the oncoming ice cream, even though the ends of the ducts are in substantial supporting engagement with the inner wall of outer tube 2 and would otherwise be plugged by such inner wall. Desirably, all the lateral open portions face the same direction as can be seen from FIG. 2. With an apparatus of the size described in the description of the drawings, an excellent sharp blend of syrup and ice cream is obtained with the ice cream pumped continuously into outer tube 2 at the rate of about 200 gallons per hour and the syrup at the rate of 20 gallons per hour, thus giving a ratio of ice cream to syrup of about 10 to 1.

Although the description has referred to ice cream and syrup, it is apparent that the apparatus can be used for blending any type of liqueform or semi-solid materials to provide a variegated of a marbleized effect; for example, blending of various colored cake and pie mixes, and candy mixes. Therefore, the terms "ice cream" and "syrup" employed herein are used in a broad sense.

I claim:

1. Apparatus for blending ice cream or the like with syrup or the like comprising a first tube having an inlet for the ice cream and a discharge nozzle portion at one end, a second tube within said first tube having an inlet for the syrup and terminating in a closed end adjacent the nozzle end of said first tube, and a plurality of syrup discharge nozzle ducts projecting outwardly from said second tube adjacent the closed end thereof, said ducts being arranged in inwardly spaced sets and having lateral portions removed adjacent their outer ends to provide lateral discharge openings for the syrup to allow the syrup to flow laterally outwardly into the ice cream, and said ducts being in substantial engagement with the inner wall of said first tube to support and center said second tube adjacent said closed end.

2. Apparatus for blending ice cream or the like with syrup or the like comprising a first tube having an inlet for the ice cream and a discharge nozzle portion at one end, a second tube within said first tube having an inlet for the syrup and terminating in a closed end adjacent the nozzle end of said first tube, a plurality of syrup discharge nozzle ducts projecting outwardly from said second tube adjacent the closed end thereof, and means for detachably securing said second tube to said first tube at a location opposite the closed end of said second tube, the ducts having lateral openings to provide lateral flow of the syrup into the ice cream, and said ducts being substantially in engagement with the inner wall of said first tube to support the closed end portion of the second tube.

3. Apparatus for blending ice cream or the like with syrup or the like comprising a first tube having an inlet for the ice cream and a discharge nozzle portion at one end, a second tube within said first tube having an inlet for the syrup and terminating in a closed end adjacent to but spaced inwardly from the nozzle end of said first tube, and a plurality of syrup discharge nozzle ducts projecting outwardly from said second tube adjacent to but inwardly of the closed end thereof, said ducts being arranged in inwardly spaced sets with the ducts of each set in substantially the same plane extending transversely with respect to the axis of said second tube and with the ducts of the respective sets angularly disposed relative to each other to position the ducts peripherally about the second tube, the ducts having lateral portions removed adjacent their outer ends to provide lateral discharge openings for the syrup, and said ducts being substantially in engagement with the inner wall of said first tube to support and center the closed end portion of the second tube.

4. Apparatus for blending ice cream or the like with syrup or the like comprising a first tube having an inlet for the ice cream and an inwardly tapered unobstructed discharge nozzle portion at one end, a second tube within said first tube having an inlet for the syrup and terminating in a closed end adjacent to but spaced inwardly from the nozzle end of said first tube, the space between said closed end and nozzle end being unobstructed, and a plurality of syrup discharge nozzle ducts projecting outwardly from said second tube adjacent to but inwardly of the closed end thereof, said ducts being arranged in inwardly spaced sets with the ducts of each set in substantially the same plane extending transversely with respect to the axis of said second tube and with the ducts of the respective sets angularly disposed relative to each other to position the ducts peripherally about the second tube, the ducts having lateral portions removed adjacent their outer ends to provide lateral discharge openings for the syrup, and said ducts being substantially in engagement with the inner wall of said first tube to support and center the closed end portion of the second tube.

5. The apparatus of claim 4 wherein the closed end of said first tube is a sealing plug removably mounted in said tube.

6. The apparatus of claim 4 wherein the duct sets are four in number and each set consists of a pair of radially extending diametrically opposite ducts, and all the ducts are spaced about the periphery of said second tube about 45° apart.

7. Apparatus for blending ice cream or the like with syrup or the like comprising a first tube having an inlet for the ice cream and a discharge nozzle portion at one end, a second tube within said first tube having an inlet for the syrup and terminating in a closed end adjacent to but spaced inwardly from the nozzle end of said first tube; means for detachably securing said second tube to said first tube at a location opposite the closed end of said second tube, and a plurality of syrup discharge nozzle ducts projecting outwardly from said second tube adjacent to but inwardly of the closed end thereof, said ducts being arranged in inwardly spaced sets with the ducts of each set in substantially the same plane extending transversely with respect to the axis of said second tube and with the ducts of the respective sets angularly disposed relative to each other to position the ducts peripherally about the second tube, the ducts having lateral portions removed adjacent their outer ends to provide lateral discharge openings for the syrup, and said ducts being substantially in engagement with the inner wall of said first tube to support the closed end portion of said second tube.

8. Apparatus for blending ice cream or the like with syrup or the like comprising a first tube having an inlet for the ice cream and a discharge nozzle portion at one end, a second tube within said first tube having an inlet for the syrup and terminating in a closed end adjacent to but spaced inwardly from the nozzle end of said first tube, and a plurality of syrup discharge nozzle ducts projecting outwardly from said second tube adjacent to but inwardly of the closed end thereof, said ducts being arranged in inwardly spaced sets with the ducts of each set in substantially the same plane extending transversely with respect to the axis of said second tube and with the ducts of the respective sets angularly disposed relative to each other to position the ducts peripherally about the second tube, the ducts having lateral portions removed adjacent their outer ends to provide lateral discharge openings for the syrup, and said ducts being substantially in engagement with the inner wall of said first tube to support the closed end portion of said second tube, the space between said closed end and the nozzle end of said first tube being unobstructed.

9. Apparatus for blending ice cream or the like with syrup or the like comprising a first tube having an inlet for the ice cream and a discharge nozzle portion at one end, a second tube within said first tube having an inlet for the syrup and terminating adjacent the nozzle portion of said first tube, and a syrup discharge nozzle duct projecting outwardly from said second tube having a lateral open portion adjacent its outer end to provide a lateral discharge opening for the syrup into the oncoming ice cream, said outer end of said duct being substantially in engagement with the inner wall of said first tube to provide support for said second tube.

10. Apparatus for blending ice cream or the like with syrup or the like comprising a first tube having an inlet for the ice cream and an inwardly tapered unobstructed discharge nozzle portion at one end, a second tube within said first tube having an inlet for the syrup and terminating in a closed end adjacent the nozzle portion of said first tube; and a plurality of syrup discharge nozzle ducts projecting outwardly from said second tube, said ducts having lateral discharge openings for the syrup, and said ducts being substantially in engagement with the inner wall of said first tube to support and center said second tube.

References Cited in the file of this patent

UNITED STATES PATENTS

| 2,284,651 | Gundlach et al. | June 2, 1942 |
| 2,816,518 | Daggett | Dec. 17, 1957 |